United States Patent [19]

Bardos et al.

[11] 4,217,632

[45] Aug. 12, 1980

[54] REGULATED POWER SUPPLY SYSTEM INCLUDING SATURABLE REACTOR MEANS

[75] Inventors: Peter A. Bardos; John E. Crowe, both of Bishop's Stortford, England

[73] Assignee: Gould Advance Limited, Essex, England

[21] Appl. No.: 923,317

[22] Filed: Jul. 10, 1978

[30] Foreign Application Priority Data

May 19, 1978 [GB] United Kingdom ............... 20881/78

[51] Int. Cl.² .......................................... H02M 3/335
[52] U.S. Cl. ........................................ 363/26; 323/7; 323/DIG. 1; 363/91
[58] Field of Search ...................... 307/17, 30, 82, 83; 323/7, 17, DIG. 1; 363/24–26, 90, 91

[56] References Cited

U.S. PATENT DOCUMENTS

| | | | |
|---|---|---|---|
| 2,843,818 | 7/1958 | Mintz et al. | 363/91 |
| 3,048,767 | 8/1962 | Smeltzer | 363/91 |
| 3,324,380 | 6/1967 | Schaefer | 363/91 X |
| 3,344,255 | 9/1967 | Ferguson | 307/83 |
| 3,976,931 | 8/1976 | Sterling | 363/90 |
| 4,122,514 | 10/1978 | Amin | 363/26 X |

OTHER PUBLICATIONS

Ramsay et al., "British Magnetic Amplifier Developments," Reprint from Electrical Manufacturing, Jul. 1958, pp. 1–4, 363–391.

*Primary Examiner*—A. D. Pellinen
*Attorney, Agent, or Firm*—Lawrence E. Laubscher

[57] ABSTRACT

A regulated power supply system is disclosed including a source of unidirectional electric current, and at least one switch device including a saturable reactor controlled between a saturated condition and an unsaturated condition in a duty cycle such that the load voltage tends to remain constant with varying load current. In one embodiment, a pair of switch devices are coupled, respectively, between the ends of a center-tapped secondary winding of a transformer having a primary winding fed from an inverter, and a pair of rectifier devices coupled to provide the unidirectional current to the load. Control of the switch devices is effected by applying an appropriately varying control voltage to like electrodes of respective inverted control diodes each coupled to the junction between a respective switch device and its associated rectifier device. The control diodes are driven from the output of a comparator amplifier responsive to the difference between the load voltage and a reference voltage. A pulse modulator fed by the amplifier output provides the control diodes with pulses of appropriate varying duty cycle.

6 Claims, 4 Drawing Figures

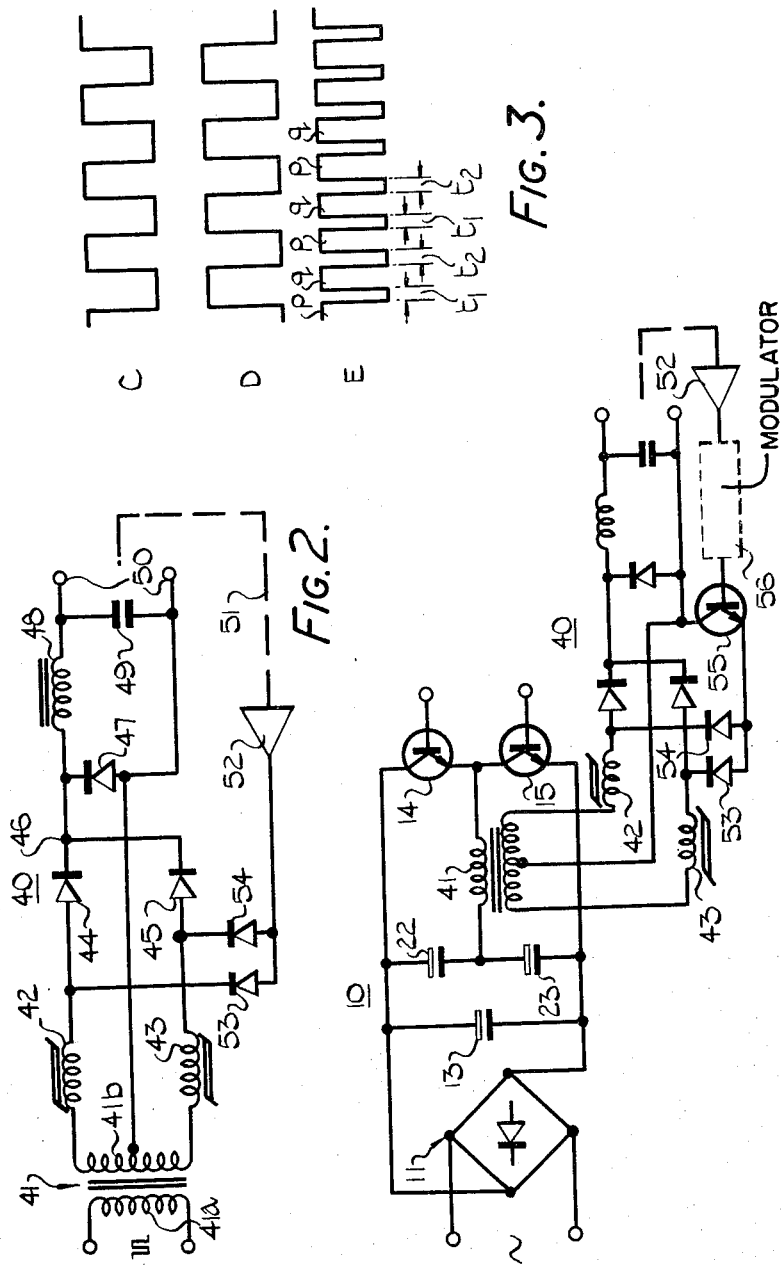

REGULATED POWER SUPPLY SYSTEM INCLUDING SATURABLE REACTOR MEANS

BACKGROUND OF THE INVENTION

1. Field of the Invention

This invention relates to a regulated power supply system arranged to provide unidirectional current to at least one load at an output voltage that remains substantially constant despite variation in load current within a predetermined range.

2. Description of the Prior Art

Regulated power supply systems are known in which a load is fed with unidirectional current by way of a switch operated with a duty cycle such that the voltage applied to the load remains substantially constant during variation of the load current, at least within a predetermined range.

In power supply systems of this kind, the voltage regulating devices commonly take the form of switches, the mode of control being such that the ratio of the "on" period of the switch to its "off" period (its duty cycle) is varied so that the switch output, when time-averaged by means of a low-pass filter, provides a unidirectional output of a desired voltage. It is a disadvantage of commonly-used solid-state switches, for example, transistors, is that there is a small but unavoidable forward voltage drop across the switch when in its conductive condition, which may give rise to severe problems of power loss and necessary heat dissipation at the high output currents required in many applications. Also it has been usual to derive a plurality of distinct unidirectional supplies from a voltage divider connected across a common unidirectional current supply and it is a disadvantage of a system of this kind that it gives rise to interaction between the plurality of loads energized from the common supply.

SUMMARY OF THE INVENTION

In accordance with the present invention disadvantages of known regulated power supply systems are overcome by using saturable reactors to provide the necessary switching action. Such a saturable reactor may consist of a plurality of turns of a copper conductor wound upon a magnetizable core having a square-loop characteristic (B-H curve). The core may consist of iron, ferrite or other known magnetic materials having the required characteristic. Such a reactor has two possible states. When the current in the winding is such that the core is operating in the unsaturated region of the B-H curve the switch is 'off'. When the core is operating on the horizontal portion of the B-H loop the winding appears as a short-circuit and the switch is 'on'. In this latter condition of the switch its effective impedance may be as low as the resistance of the copper winding itself, which may be very low, so that power loss is small even when very high currents are being passed.

The system of the invention preferably makes use of known techniques whereby, instead of using a bulky and expensive supply-frequency transformer to provide voltage isolation between an alternating-current supply and one or more sources of unidirectional voltage energized from said supply, a smaller and cheaper transformer energized from a high-frequency inverter, in turn powered from the a.-c. supply, is used.

An embodiment of the present invention comprises a source of unidirectional current and switch means arranged to control the passage of current from said source to output terminals in a duty cycle such that the output voltage at said output terminals remains substantially constant with predetermined variation in load current, and switch means comprising a saturable reactor arranged to be controlled between a substantially saturated condition and a substantially unsaturated condition.

BRIEF DESCRIPTION OF THE DRAWINGS

FIG. 2 shows one embodiment of power supply system embodying the invention;

FIG. 3 comprises waveform diagrams illustrating the operation of the system of FIG. 2; and FIG. 4 shows modifications of power supply systems embodying the invention.

DESCRIPTION OF PREFERRED EMBODIMENTS

Figure 1:
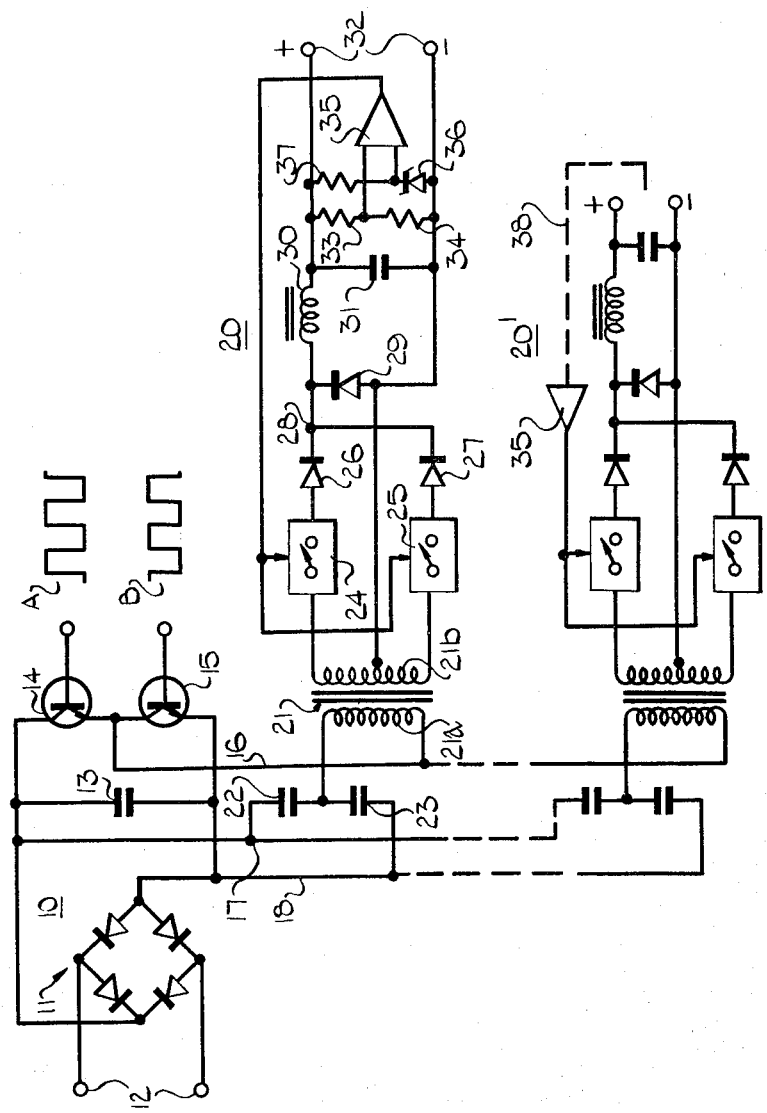
FIG. 1 shows a circuit diagram of a power supply system in which the present invention may be incorporated.

Referring firstly to FIG. 1 of the drawings, the system illustrated comprises an inverter 10 energized from an a.-c. supply and arranged to feed a plurality of mutually isolated output circuits, of which two only are shown at 20 and 20'.

In known manner, inverter 10 comprises a rectifier bridge 11 energized directly by an a.-c. supply received at terminals 12 and providing a smoothed, full-wave rectified supply across a reservoir capacitor 13. This supply is chopped by a pair of transistors 14, 15 which are turned on alternately by antiphased rectangular-wave drive voltages, indicated by waveforms A and B, which are applied to their bases from a known drive circuit (not shown). It will be understood that the inverter described above may, in carrying out the invention, be replaced by other inverter arrangements providing like outputs.

Each output circuit, such as 20, 20' may be of like construction and for this reason only circuit 20 will be described. An alternating voltage at the inverter output frequency is provided to the primary winding 21a of a transformer 21 of power supply 20. This input voltage is taken between a line 16, which is connected to the junction of inverter transistors 14, 15 and is thus connected alternately to the positive and to the negative output of rectifier bridge 11, and the junction of a series pair of capacitors 22, 23, connected across the output of rectifier bridge 11 by way of lines 17 and 18, and thus providing an artificial centre-tap on the bridge output.

Transformer 21 has a centre-tapped secondary winding 21b, the ends of which are connected by way of respective switching devices 24, 25 and respective like-poled diodes 26, 27 to a common point 28, which is also connected to the centre-tap of winding 21b by way of a further like-poled diode 29. The voltage appearing at common point 28 is smoothed by a low-pass filter comprising in this embodiment a series inductor 30 and a shunt capacitor 31. It will be apparent that other forms of filter, including active filters if preferred, may be employed should this be considered desirable. The voltage appearing across capacitor 31 is applied to output terminals 32 whence it is taken for application to a load, as required.

Means are provided to develop a signal dependent upon the relation between the output voltage appearing at terminals 32 and a reference potential. One means for so doing will now be described, but other known means of the art may be used if preferred. A predetermined fraction of the output voltage appearing at terminals 32 is taken by means of a voltage divider formed by resistors 33, 34 connected in series across the output and is applied to one input of a comparator amplifier 35. To the other input of comparator amplifier 35 there is applied to potential appearing across a Zener diode 36 which is energized from the output voltage by way of a resistor 37. The output of comparator amplifier 35 will thus vary in accordance with the relation between the output voltage and the reference potential provided by Zener diode 36. This signal is applied to control switching devices 24, 25 in such a manner as to tend to prevent variation of the output voltage.

In subsequent diagrams illustrating embodiments of the invention a detailed illustration of the means for deriving the necessary control signal is omitted, instead and as in the case of power supply 20', the input side of amplifier 35 is shown as associated with the output by way of a broken line, here designated 38.

FIG. 2 illustrates one embodiment of regulated power supply systems embodying the invention. The power supply 40 shown in FIG. 2 is assumed to be energized from an inverter as is the case for power supply systems 20 and 20' of FIG. 1. The chopped, inverter output voltage is applied to primary winding 41a of a transformer 41 having a centre-tapped secondary winding 41b. Each end of secondary winding 41b is connected by way of a respective saturable reactor 42, 43 and a respective diode 44, 45 to a common point 46, which is also connected by a diode 47 to the centre-tap of secondary winding 41b. The output is smoothed by a filter comprising a series inductor 48 and a shunt capacitor 49 and the smoothed output is taken to a load by way of output terminals 50. As already described, means are provided for generating a control signal dependent upon the relation between the output voltage and a predetermined reference potential, these means being indicated only by broken line 51 coupling the output 50 to the input side of an amplifier 52, of which the output is applied by way of respective diodes 53, 54 to the junctions between saturable reactors 42, 43 and diodes 44, 45, respectively.

The rectangular-wave signal appearing on the secondary winding 41b of transformer 41 is applied to the saturable reactors 42, 43. Consider the situation when the voltage applied to reactor 42 is positive and that applied to reactor 43 is negative with respect to the centre tap. If it is assumed that the core of reactor 42 is somewhere on the unsaturated region of its B-H loop, then the winding of this reactor will conduct only that current corresponding to this portion of the loop, which may be arranged to be quite small.

Any load current flowing from the output terminals 50 of the circuit must thus circulate through the output filter choke 48 and the free-wheeling diode 47, and all of the voltage appearing at the secondary winding 41b must appear across the reactor 42. This voltage across the winding will cause the core to proceed round its B-H loop and eventually the core will enter saturation. When this happens, the voltage across the core will collapse, and rectifier 44 will come into conduction. In this situation, the positive secondary voltage is being transmitted into the smoothing filter via reactor 42 and diode 44 so that the output load current is flowing through 42, 44, 48 and the secondary winding 41b of the transformer. This situation will now continue until the high frequency inverter undergoes one of its periodic switching actions, and the voltages applied to reactors 42 and 43 reverse. The circuit now behaves again as previously described, but now with reactor 43 in its "off" state, and load current circulating through diode 47. After a time, as before, reactor 43 will enter saturation, and voltage will be transmitted into the smoothing filter from the secondary winding. The waveform appearing at point 46 in FIG. 2 is shown by waveform C in FIG. 3, in relation to the inverter waveforms shown by waveforms A and B. Waveform portions p correspond to conduction in reactor 42 and portions q to conduction in reactor 43. The periods $t_1$ and $t_2$ are the times taken for reactors 42 and 43 respectively to enter saturation from the beginning of the inverter half-cycle. The two halves of the circuit are in fact symmetrical, so that $t_1 = t_2$. It will be seen that since the voltage appearing at the output terminals is the time-averaged value of the waveform at point 1 then the actual value of this output voltage may be controlled if the time periods $t_1 = t_2$ are controlled. The manner in which $t_1 = t_2$ may be controlled will now be described.

We have considered the operation of the magnetic regulating devices during positive half-cycles of the secondary voltage. Let us now consider what happens to, say, reactor 42 during a negative half-cycle. Rectifier 44 will be reverse biased, the output end of reactor 42 will be held by diode 53 at a potential corresponding to the state of the output of amplifier 52. The core of reactor 42 will travel into the negative half of its B-H loop, and will travel along the loop a distance set by the condition of the output of amplifier 52. It will be seen that during the next positive half-cycle, or power stroke, the core of reactor 42 will proceed towards saturation from a starting point of magnetization which has been determined by amplifier 52 during the preceding half-cycle. A similar argument applies to the behaviour of reactor 43 during its own negative, or pre-set, half-cycle.

FIG. 4 shows the combination of an inverter 10 as described in relation to FIG. 1 with a power supply system 40 generally as described in relation to FIG. 2. With such a combination it is very important that symmetry of operation of the two saturable reactors used as regulating devices is achieved. If it is not, for instance if $t_1 = t_2$, then the transistors in the half-bridge inverter will draw their constant reflected load current from the capacitor combination 22, 23, for differing periods of time, and a resulting excursion of the voltage at their mid-connection, towards one of the supply rails, will occur. This will cause saturation of the transformer core and damage to the transistors. This difficulty may be eliminated by means of a simple precaution which will be explained.

Suppose, for example, that the core of reactor 42 has a lower value of saturation induction $B_{sat}$ than does the core of reactor 43, thus having a tendency to become saturated in a shorter period of time. This will result in inverter transistor 14 having to conduct its load current for longer periods of time than transistor 15. This will in turn cause the voltage at the junction of capacitors 22 and 23 to move in a positive direction, so that when transistor 14 conducts a smaller voltage is applied to the primary of transformer 41 than when transistor 15 conducts, and this causes a smaller voltage to be applied to the winding of reactor 42 during the first portion of its operative half-cycle than that applied to the winding of reactor 42 during the corresponding portion of its operative half-cycle. This action itself provides some degree of compensation for the original asymmetry, but increased compensation may be provided by the expedient of constructing control amplifier 52 so as to have a low output impedance. This is indicated in FIG. 4 by the provision of emitter-follower transistor 55 between the output of amplifier 52 and diodes. By this means the core of reactor 42, which had a tendency to saturate too soon as compared with that of reactor 43, now not only has a smaller voltage applied to it during the first half of its operative half-cycle, but also has a larger voltage applied to it during its inoperative half-cycle, thus driving it further into the negative portion of the B-H loop. This tends to increase the compensating effect.

For this compensating arrangement to be effective in the case of multi-output power supply systems, where each output is fed by way of a respective pair of regulating reactors, then each output must be fed by way of an individual transformer and pair of splitter capacitors, as is indicated for output circuits 20 and 20' in FIG. 1.

It is an advantage of the invention that the entire control circuit, from the voltage-sensing means connected to the output terminals to the emitter-follower 55 of FIG. 4, is a d.-c. system; no pulse generators are required and no modulator for translating error signals into pulse trains is necessary. This ensures simple and therefore reliable control circuitry.

A possible disadvantage of the system as described above in relation to FIG. 4 is that the emitter-follower 55 operates in accordance with the applied control signal, that is, it is neither cut-off nor saturated and therefore dissipates a finite amount of power. This disadvantage may be overcome by providing between amplifier 52 and emitter-follower 55 a modulator circuit arrangement 56, as shown in broken line in FIG. 4, which is arranged to provide to emitter-follower 55 pulses of an amplitude to drive the transistor between cut-off and saturation with a duty cycle varying in accordance with the amplitude of the control signal developed by amplifier 52. Alternatively the duration of the drive pulses may be constant but their repetition rate may be appropriately varied.

This method of drive may be employed to reduce overall drive dissipation at some expense in circuit complexity.

In a physical realisation of this type of circuit, it is important to keep to a minimum the stray inductance associated with the wiring together of the magnetic regulating devices and the secondary circuit rectifiers. This is because these components carry current with a large a.-c. component, and any stray inductance here would give rise to undesirable circuit effects, especially at the high output currents which this form of regulator is particularly suitable for handling. To this end it is desirable to reduce to a minimum the number of turns which is wound on the regulating devices. The logical extreme of this is where the number of turns is reduced to one; in this case the device may take the form of a number of toroids, as many as is required to provide the necessary dwell or hold-off time before saturation, which are threaded on to a single straight conductor which may form an extension of the transformer secondary terminal. This conductor may be of a diameter limited only by the internal diameter of the toroids, since with only one turn no degree of flexibility in the conductor is required, thus conductors capable of conducting very large currents may be easily produced.

The conductor may, for instance, take the form of a single copper rod or busbar, or if skin effect due to the frequency of operation precludes the use of a single conductor, a bunch of conductors, or a section of power Litzendraht wire may be used.

By this means, the apparently conflicting requirements of very low stray inductance, very high current capability, freedom from skin effect, and simplicity of assembly, may be met in a reasonably practical fashion.

Although only particular embodiments of the invention have been described and illustrated, it will be apparent to those skilled in the art that various modifications and alterations may be made therein. It is therefore the intention in the appended claims to cover all such modifications and alterations as may fall within the true spirit and scope of the invention.

What is claimed is:

1. Regulated power supply apparatus, comprising:
   (a) a source of unidirectional current;
   (b) a half-bridge inverter circuit including a pair of switching devices connected in series with said unidirectional current source and arranged to provide a periodically inverted voltage at the junction between said two switching devices, said inverter circuit further including transformer means receiving said periodically inverted voltage for providing antiphased outputs;
   (c) first and second saturable reactors (42, 43) connected with the antiphased outputs of said transformer means, respectively;
   (d) first and second rectifier diodes (44, 45) having first terminals connected with said first and second saturable reactors, respectively, the other terminals of said rectifier diodes being connected together to provide an output voltage; and
   (e) low impedance control means responsive to said output voltage for controlling said first and second saturable reactors between substantially saturated and substantially unsaturated conditions, said low impedance control means including
      (1) a low impedance device having an output terminal; and
      (2) first and second control rectifying means (53, 54) connecting said low impedance output terminal with the junctions between said first and second saturable reactors and said first and second rectifier diodes, respectively, thereby providing compensation for asymmetry in said periodically inverted output voltage of said inverter circuit.

2. Apparatus as defined in claim 1, and further including means (36) defining a reference potential, and further wherein said low impedance control means provides at its low impedance output terminal a control signal the amplitude of which varies in accordance with the relation between said output voltage and said reference potential.

3. Apparatus as claimed in claim 2, wherein said low impedance control means comprises a comparator amplifier (52) having a pair of inputs and an output, and means applying to one of said inputs a voltage proportional to said output voltage and to the other of said inputs said reference potential, whereby said control signal appears at said amplifier output.

4. Apparatus as claimed in claim 3, wherein said low impedance control means further includes an emitter-follower transistor (55) the emitter electrode of which forms the low impedance output of said control means, and means applying said control signal to the base electrode of said transistor.

5. Apparatus as claimed in claim 4, wherein said control signal applying means comprises modulator means (56) connected between said comparator amplifier and said emitter-follower transistor for driving said transistor between cut-off and saturation with a duty cycle varying in accordance with said control signal.

6. Apparatus as defined in claim 1, and further including at least one pair of splitter capacitors (22, 23) connected in series across said source of unidirectional current, said transformer means including at least one transformer having a primary winding (41) connected at one end with the junction between said splitter capacitors, the other end of said primary winding being connected with the junction between said switching devices, said transformer having a secondary winding providing said antiphased outputs to said first and second rectifier diodes via said first and second saturable reactors, respectively.

* * * * *